(12) United States Patent  
Horiuchi (10) Patent No.: US 7,312,932 B2  
(45) Date of Patent: Dec. 25, 2007

(54) ZOOM LENS SYSTEM AND IMAGE PICKUP APPARATUS HAVING THE SAME

(75) Inventor: Akihisa Horiuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/627,188

(22) Filed: Jan. 25, 2007

(65) Prior Publication Data

US 2007/0115562 A1 May 24, 2007

Related U.S. Application Data

(63) Continuation of application No. 11/044,883, filed on Jan. 26, 2005, now Pat. No. 7,193,787.

(30) Foreign Application Priority Data

Jan. 30, 2004 (JP) .............................. 2004-024343

(51) Int. Cl.  
*G02B 15/14* (2006.01)

(52) U.S. Cl. .................. 359/687; 359/686; 359/774

(58) Field of Classification Search ............. 359/687, 359/683, 686, 676, 677, 772, 771, 774  
See application file for complete search history.

(56) References Cited

U.S. PATENT DOCUMENTS

| 5,530,592 A | 6/1996 | Tochigi |
| 5,583,698 A | 12/1996 | Yamada et al. |
| 5,963,378 A | 10/1999 | Tochigi et al. |
| 6,084,722 A | 7/2000 | Horiuchi |
| 6,178,049 B1 | 1/2001 | Mukaiya et al. |
| 6,392,817 B1 * | 5/2002 | Horiuchi ..................... 359/687 |
| 6,940,656 B2 * | 9/2005 | Oomura et al. ............. 359/687 |

FOREIGN PATENT DOCUMENTS

| JP | 6-51199 A | 2/1994 |
| JP | 6-337353 A | 12/1994 |
| JP | 6-347697 A | 12/1994 |
| JP | 7-199069 A | 8/1995 |
| JP | 7-270684 A | 10/1995 |
| JP | 7-318804 A | 12/1995 |
| JP | 9-281390 A | 10/1997 |
| JP | 9-281391 A | 10/1997 |
| JP | 9-304698 A | 11/1997 |
| JP | 11-23965 A | 1/1999 |
| JP | 11-287952 A | 10/1999 |
| JP | 11-287954 A | 10/1999 |
| JP | 2000-305016 A | 11/2000 |
| JP | 2003-241088 A | 8/2003 |

* cited by examiner

*Primary Examiner*—Timothy Thompson  
(74) *Attorney, Agent, or Firm*—Morgan & Finnegan, LLP

(57) ABSTRACT

Disclosed is a zoom lens system, in order from an object side to an image side, including: a first lens unit having a positive optical power; a second lens unit having a negative optical power; a third lens unit having a positive optical power; and a fourth lens unit having a positive optical power, in which during zooming, intervals of the lens units are changed. In such a zoom lens system, a material having a large refractive index is adopted for a material constituting a negative lens element disposed on the most object side in the second lens unit, whereby high optical performance is realized while the whole lens system is miniaturized.

3 Claims, 7 Drawing Sheets

ZOOM LENS SYSTEM AND IMAGE PICKUP APPARATUS HAVING THE SAME

This application is a continuation application of U.S. patent application Ser. No. 11/044,883, which was filed Jan. 26, 2005, now U.S. Pat. No. 7,193,787 to which priority under 35 U.S.C. § 120 is claimed.

BACKGROUND OF THE INVENTION

1. Field of the Invention

The present invention relates to a zoom lens system which is suitably used for an electronic camera such as a video camera or a digital still camera, a film camera, a broadcasting camera, or the like, and an image pickup apparatus using the same.

2. Related Background Art

In recent years, along with high function promotion and miniaturization of an optical apparatus using a solid-state image pickup element, such as a video camera, a digital still camera, portable terminal equipment (PDA: personal digital assistants), a mobile telephone, and a conventional photographing camera, it is required that high optical performance is compatible with miniaturization also in an optical system used for such an optical apparatus.

In particular, for a zoom lens used for those optical apparatuses, efforts are made on increase in a high zooming ratio, shortening of a total lens length, miniaturization of a front lens diameter, simplification of a lens configuration, and the like. In addition, along with the high performance promotion (digitization and high definition (HD) promotion) of a video cassette recorder, the high image quality promotion has progressed.

As one method for realizing the high quality promotion, there is a method in which color separation of an image is carried out by a color separation optical system and the image of a subject is captured by every color using solid-state image pickup elements corresponding to the individual colors. In addition, as one method for miniaturizing an optical system, there is a method adopting a so-called rear focusing system in which lens units other than a first lens unit on a side of an object are moved to focus (e.g., refer to JP 6-51199 A,
JP H6-337353 A (corresponding to U.S. Pat. No. 5,530,592),
JP H6-347697 A (corresponding to U.S. Pat. No. 5,583,698),
JP H7-199069 A (corresponding to U.S. Pat. No. 5,583,698),
JP H7-270684 A (corresponding to U.S. Pat. No. 5,963,378),
JP H7-318804 A (corresponding to U.S. Pat. No. 5,963,378),
JP H9-281390 A (corresponding to U.S. Pat. No. 6,178,049),
JP H9-281391 A (corresponding to U.S. Pat. No. 6,178,049),
JP H9-304698 A (corresponding to U.S. Pat. No. 6,178,049),
JP H11-23965 A (corresponding to U.S. Pat. No. 6,084,722),
JP H11-287952 A, JP H11-287954 A, JP 2000-305016 A, and JP 2003-241088 A).

In general, since the relatively compact and light lens units are moved during zooming, the rear focusing system has the features that the compatibility with the auto-focusing system is excellent and so forth because a small driving force for driving the lens units is only required, and the focusing can be speedily carried out. In addition, the rear focusing system has the features that the proximity photographing, especially, very proximity photographing is possible.

In the zoom lens proposed in each of the above-mentioned patent applications other than JP 2000-305016 A, the long back focus is ensured in which it is supposed to dispose three color separation prisms on an image side. However, in each of the embodiments described therein, the zooming ratio is equal to or smaller than 16 times.

On the other hand, along with the high density promotion of the solid-state image pickup element such as a CCD, a high resolution frequency is required for the zoom lens. In general, the image degradation due to the diffraction is promoted as a stop diameter of a stop provided in an optical system becomes small, or as a stop becomes opening state in which an opening shape is widely different from a true circular shape.

Adoption of an iris stop or insertion of an ND filter into an optical path are known as a method for solving the problem, in which the stop diameter is prevented from decreasing, thereby suppressing an influence of diffraction to a minimum. However, according to this method, the optical system has a tendency to be easily scaled up due to complexity of a stop mechanism and an increase in an interval on an optical axis required for the insertion of the ND filter.

For example, in the case of the zoom lens proposed in JP 2000-305016 A, it is hard to say that the intervals of the front and the rear the stop are sufficiently ensured.

SUMMARY OF THE INVENTION

The present invention has been made in consideration of the related art described above, and therefore, an object of the present invention is to provide a zoom lens system having high optical performance while miniaturizing the whole lens system.

A zoom lens system according to an example of the present invention is characterized by including: a first lens unit having a positive refractive power (optical power=reciprocal of focal length); a second lens unit having a negative refractive power; a third lens unit having a positive refractive power; and a fourth lens unit having a positive refractive power in order from an object side to an image side. During zooming, intervals of the first to fourth lens units are changed. Letting N21 be a refractive index of a material constituting a negative lens element, of the second lens unit, disposed on the most object side, a following condition is satisfied:

$$1.90 < N21 < 2.50.$$

DESCRIPTION OF THE PREFERRED EMBODIMENTS

Preferred embodiments of a zoom lens system and an image pickup apparatus having the same of the present invention will hereinafter be described with reference to the accompanying drawings.

Figure 1:
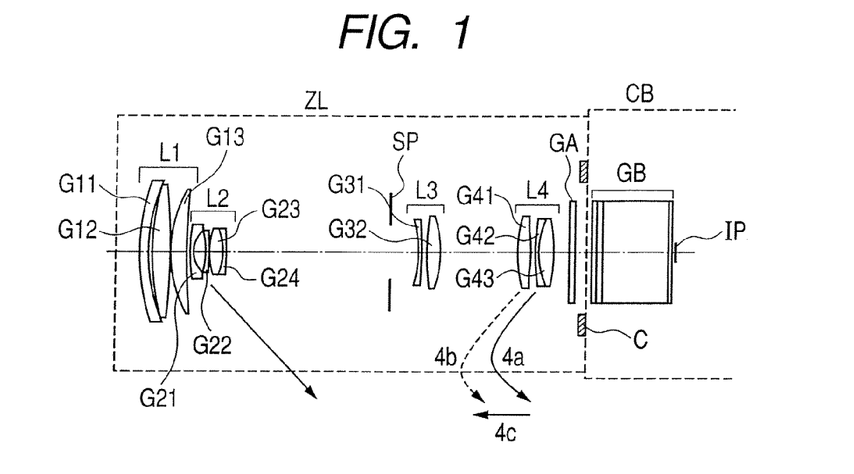
FIG. 1 is a cross sectional view according to Embodiment 1 of the present invention.
Figure 2:
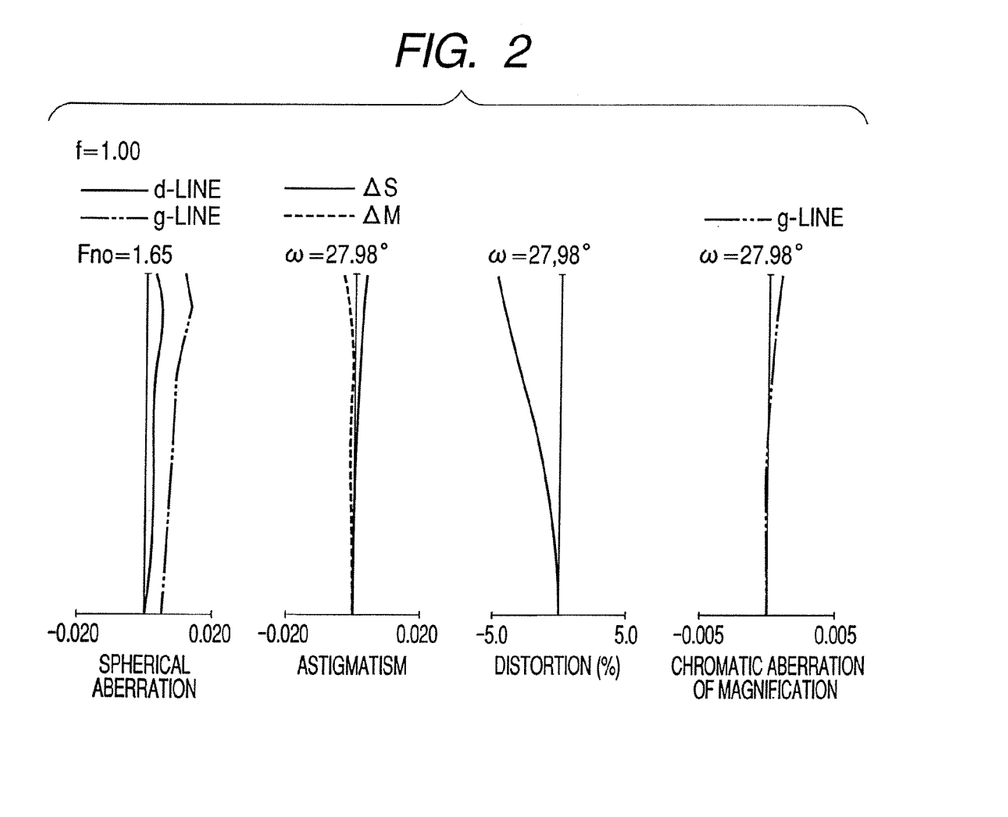
FIG. 2 is a view explaining an aberration in a wide-angle end in Embodiment 1.
Figure 3:
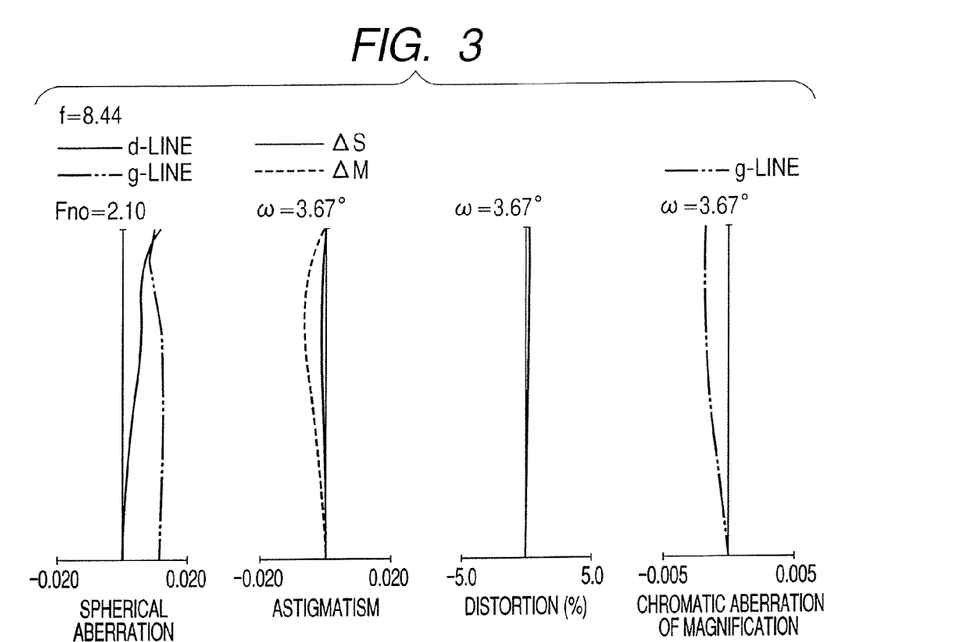
FIG. 3 is a view explaining an aberration in an intermediate zoom position in Embodiment 1.
Figure 4:
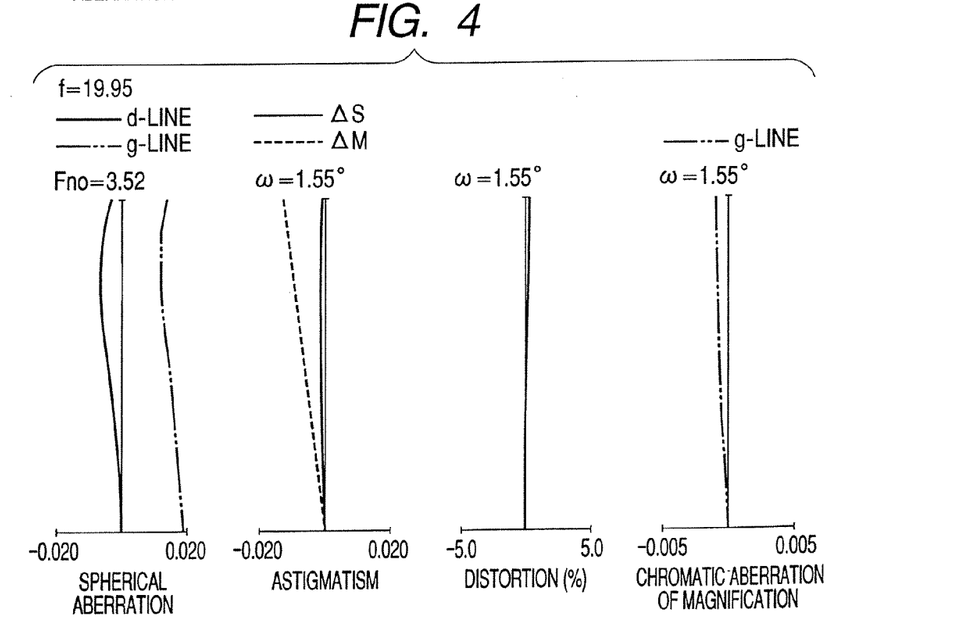
FIG. 4 is a view explaining an aberration in a telephoto end in Embodiment 1.

FIG. 1 is a cross sectional view in a wide-angle end (short focal length end) of a zoom lens system according to Embodiment 1 of the present invention, and FIGS. 2, 3, and 4 are views of aberrations in a wide-angle end, an intermediate zoom position, and a telephoto end (long focal length end) of the zoom lens system according to Embodiment 1 of the present invention, respectively.

Figure 5:
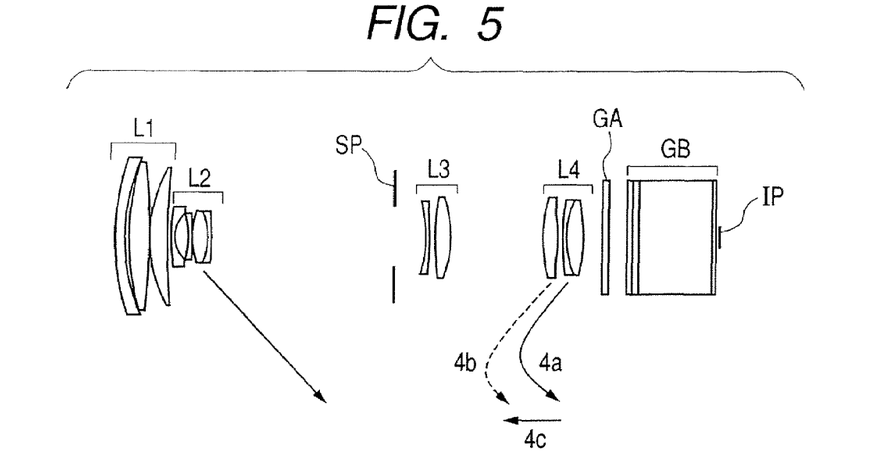
FIG. 5 is a cross sectional view according to Embodiment 2 of the present invention.
Figure 6:
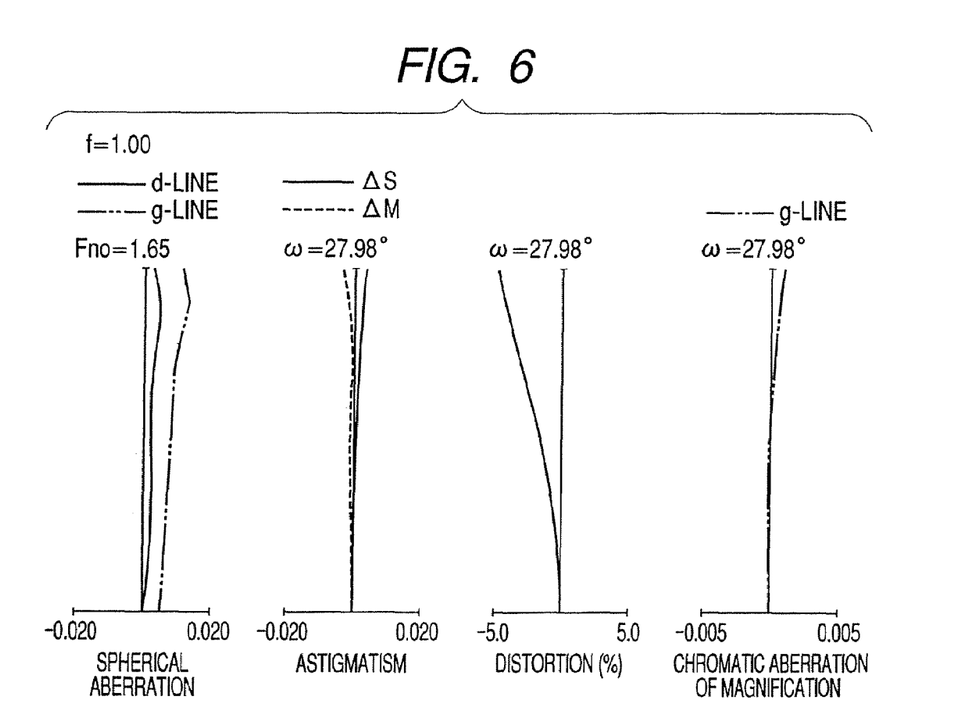
FIG. 6 is a view explaining an aberration in a wide-angle end in Embodiment 2.
Figure 7:
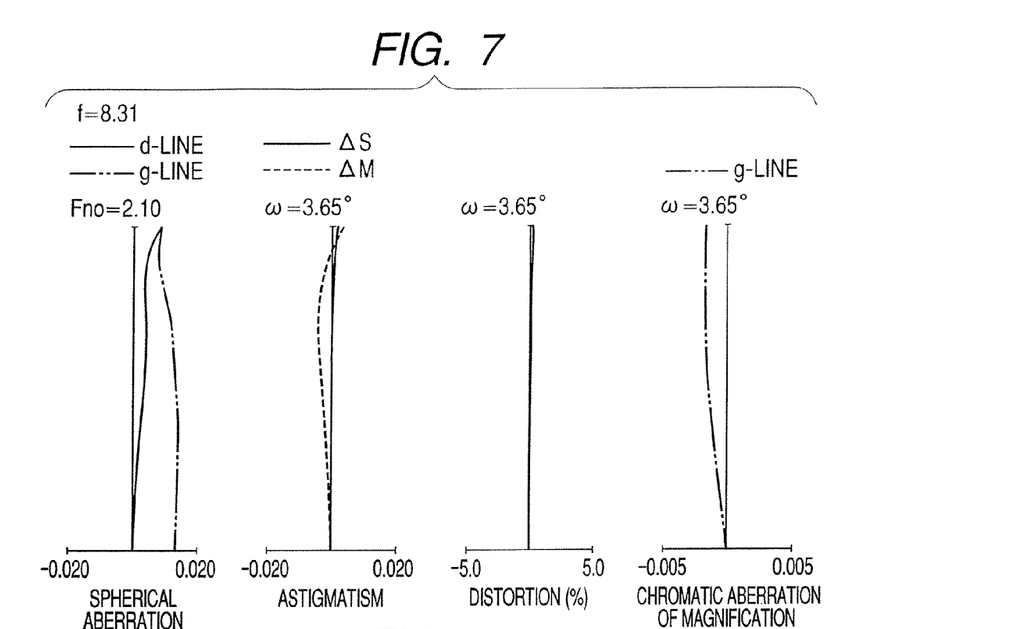
FIG. 7 is a view explaining an aberration in an intermediate zoom position in Embodiment 2.
Figure 8:
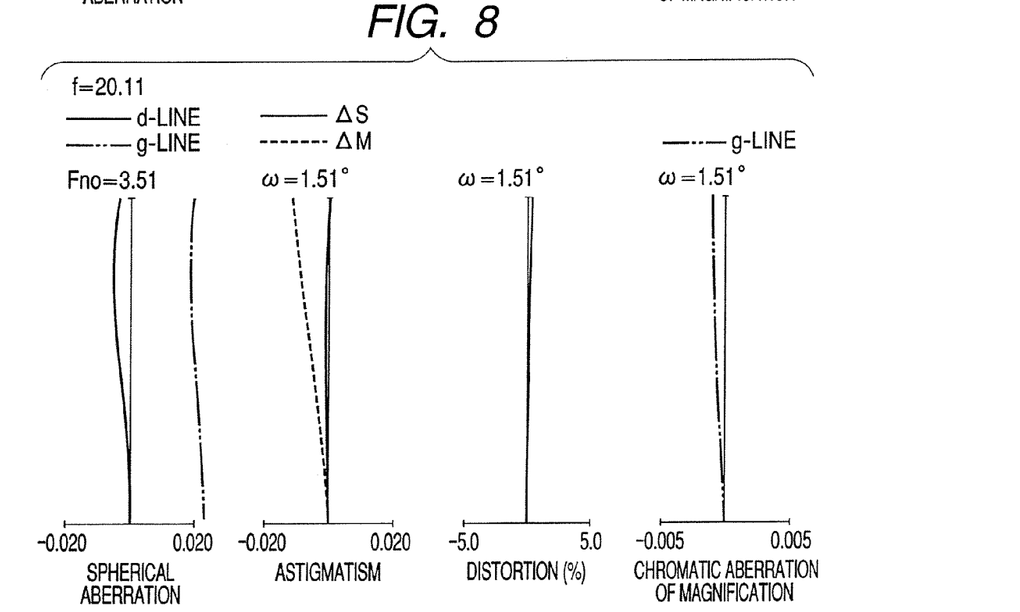
FIG. 8 is a view explaining an aberration in a telephoto end in Embodiment 2.

FIG. 5 is a cross sectional view in a wide-angle end of a zoom lens system according to Embodiment 2 of the present invention, and FIGS. 6, 7, and 8 are views of aberrations in a wide-angle end, an intermediate zoom position, and a telephoto end of the zoom lens system according to Embodiment 2 of the present invention, respectively.

Figure 9:
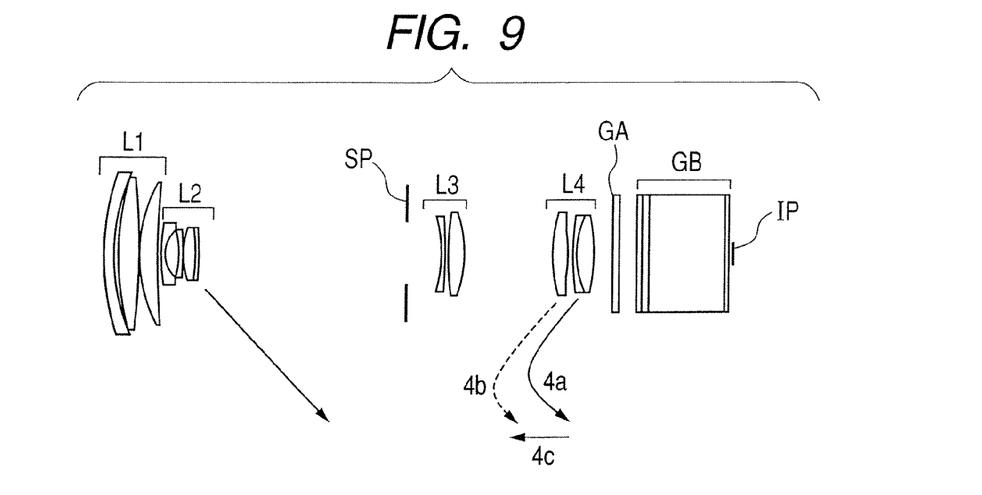
FIG. 9 is a cross sectional view according to Embodiment 3 of the present invention.
Figure 10:
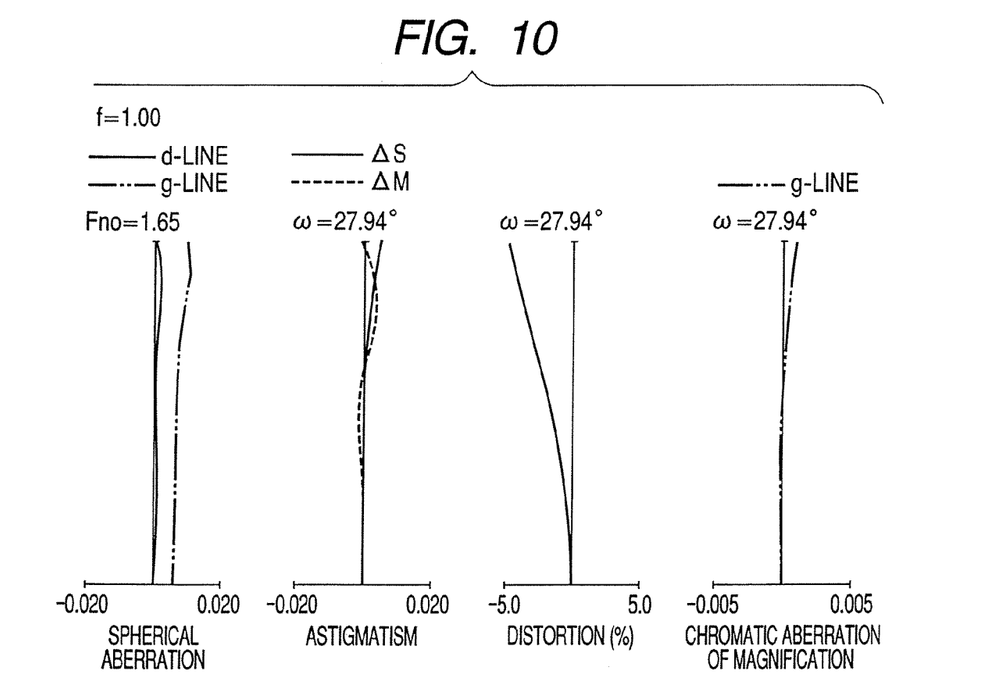
FIG. 10 is a view explaining an aberration in a wide-angle end in Embodiment 3.
Figure 11:
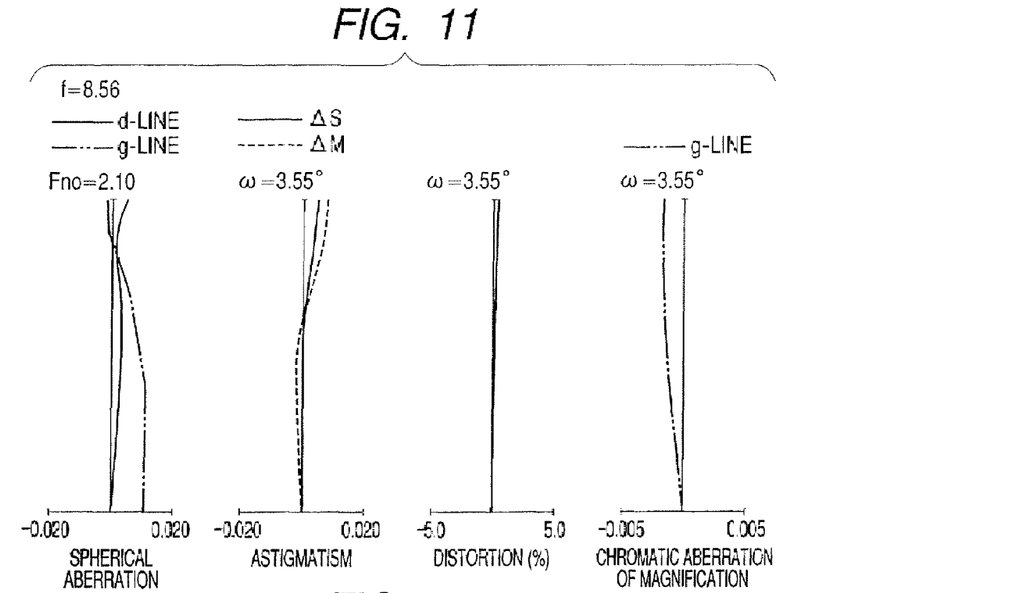
FIG. 11 is a view explaining an aberration in an intermediate zoom position in Embodiment 3.
Figure 12:
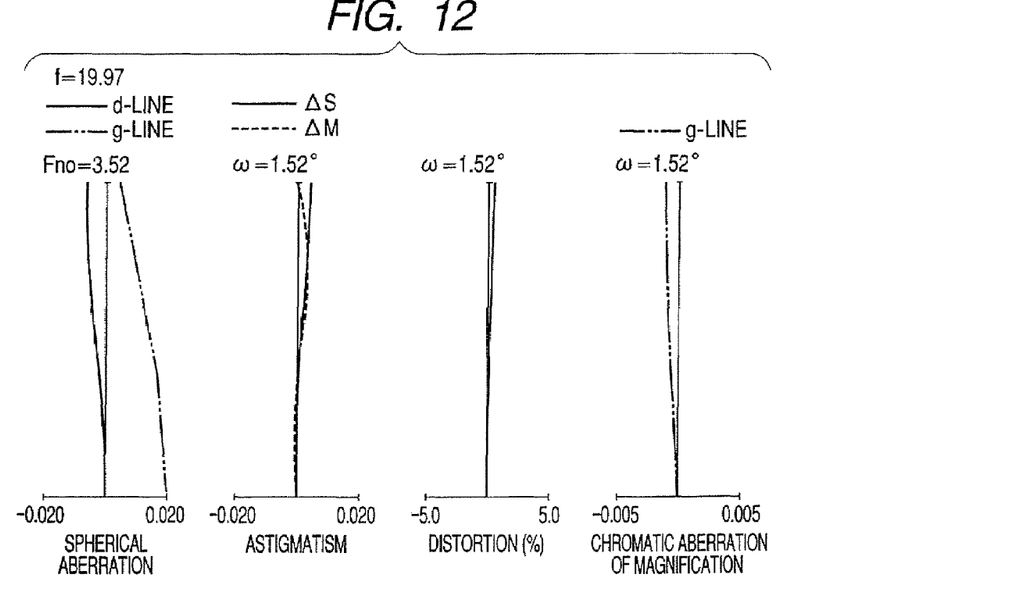
FIG. 12 is a view explaining an aberration in a telephoto end in Embodiment 3.

FIG. 9 is a cross sectional view in a wide-angle end of a zoom lens system according to Embodiment 3 of the present invention, and FIGS. 10, 11, and 12 are views of aberrations in a wide-angle end, an intermediate zoom position, and a telephoto end of the zoom lens system according to Embodiment 3 of the present invention, respectively.

Figure 13:
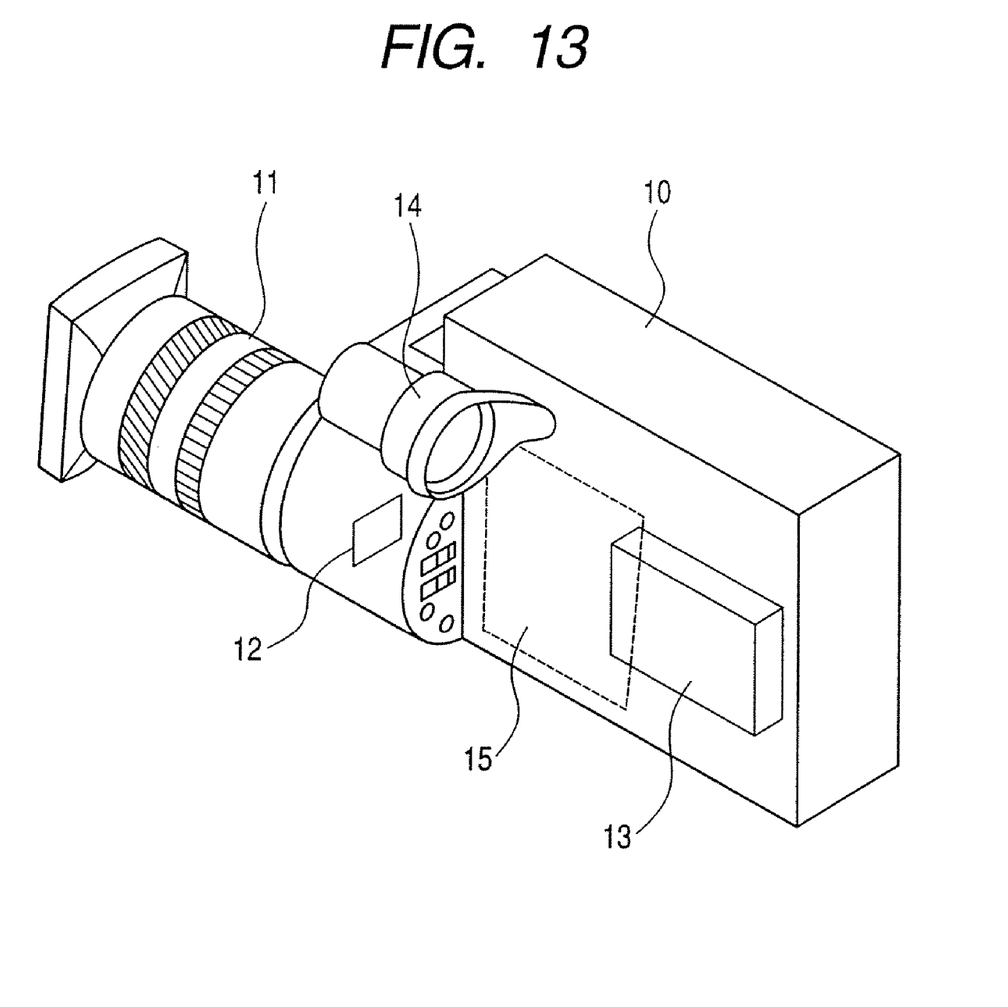
FIG. 13 is a schematic perspective view of a main portion of an image pickup apparatus.

FIG. 13 is a schematic perspective view of a main portion of a video camera (image pickup apparatus) including the zoom lens system of the present invention.

The zoom lens system of each of Embodiments 1, 2, and 3 is a photographing lens system used for an image pickup apparatus. In FIG. 1, reference symbol ZL designates a zoom lens, and reference symbol CB designates a camera body.

Reference symbol L1 designates a first lens unit having a positive refractive power (optical power=reciprocal of focal length), reference symbol L2 designates a second lens unit having a negative refractive power, reference symbol L3 designates a third lens unit having a positive refractive power, and reference symbol L4 designates a fourth lens unit having a positive refractive power. Reference symbol SP designates an aperture stop for adjusting a quantity of light. The aperture stop SP is located on an object side of the third lens unit L3.

Reference symbol GA designates a protective glass which is provided for the purpose of protecting the zoom lens ZL as may be necessary.

Reference symbol GB designates an optical block corresponding to a color separation prism, an optical filter, a face plate, a low-pass filter, and the like. Reference symbol IP designates an image plane which corresponds to an image pickup plane of a solid-state image pickup element (photoelectric transducer) such as a CCD sensor or a CMOS sensor when the zoom lens system is used as a photographing optical system of a video camera or a digital still camera, and corresponds to a film surface when the zoom lens system is used as a photographing optical system of a silver halide film camera.

Each of the constituent elements from the first lens unit L1 to the protective glass GA constitutes a constituent element of the zoom lens (zoom lens portion) ZL. The glass block GB and the image pickup element are accommodated in the camera body CB. The zoom lens portion ZL is adapted to be removably mounted to the camera body CB through a mount member C.

In the aberration views, reference symbols d and g designate a d-line and a g-line, respectively, and reference symbols ΔM and ΔS designate a meridional image plane and a sagittal image plane, respectively. Also, a chromatic aberration of magnification is represented by the g-line.

Note that in Embodiments 1, 2, and 3 which will be described below, a wide-angle end and a telephoto end mean zoom positions when the lens unit (corresponding to the second lens unit L2 in each of Embodiments 1, 2, and 3) for magnification variation is located in both ends within a movable range on the optical axis in terms of a mechanism, respectively.

In each of the embodiments, during the zooming from the wide-angle end to the telephoto end, the second lens unit L2 is moved, as shown by an arrow, to image side, and the fourth lens unit L4 is moved to the object side so as to have a convex locus to correct a change in image plane accompanying the magnification.

In addition, a rear focusing system is adopted in which the focusing is carried out by moving a part of or all of the fourth lens unit L4 (all of the fourth lens unit L4 in each of Embodiments 1, 2, and 3) on the optical axis.

The movement locus of the fourth lens unit L4 accompanying the zooming differs depending on the object distances.

A solid curved line 4a and a dotted curved line 4b which are related to the fourth lens unit L4 are the movement loci for correcting the fluctuation in the image plane accompanying the magnification variation when focused on an infinite object and a near object, respectively. The fourth lens unit L4 is moved during zooming so as to have locus convex to the object side, whereby a space defined between the third and fourth lens units L3 and L4 can be effectively utilized to attain effectively the shortening of the total length of the zoom lens system.

In each of the embodiments, for example, in focusing on from an infinite object to a near object, at the telephoto end, the fourth lens unit L4 is moved forwardly as indicated by an arrow 4c. Note that while the first and third lens units L1 and L3 are fixed in the optical axis direction during zooming and focusing, the first and third lens units L1 and L3 may be moved as may be necessary in terms of the aberration correction.

In addition, all of or a part of the third lens unit L3 is moved so as to have a component in a direction vertical to the optical axis, whereby the transition of an subject image when the hand shaking or the like occurs.

A video camera (image pickup apparatus) of the present invention shown in FIG. 13 includes at least the above-mentioned zoom lens, a color separation element, image pickup elements provided in correspondence to colors obtained by the color separation by the color separation element, a circuit for processing an image pickup signal, and the like.

In each of the embodiments, the first lens unit L1 is constituted in order from the object side to the image side by a lens G11 having a negative refractive power, a lens G12 having a positive refractive power, and a lens G13 having a positive refractive power in order to satisfactorily correct the aberrations.

At least one of a plurality of lenses G12 and G13 having a positive refractive power in the first lens unit L1 is made of a material having an Abbe's number not smaller than 80.

Thus, the chromatic aberration is corrected.

In general, when the zooming ratio comes to have such high magnification as to be about 20 times, the occurrence of the chromatic aberration in the telephoto end becomes a problem. In particular, if a CCD having high definition is used as the image pickup element, the remaining of the chromatic aberration largely reduces the image quality.

In order to solve this problem, an extraordinary dispersion glass material having an Abbe's number not smaller than 80 is desirably used as a lens material for the first lens unit L1 having a positive refractive power. More desirably, it is effective to use an extraordinary dispersion glass material having an Abbe's number not smaller than 80 for the lens which has a positive refractive power and which is located in the most object side of the first lens unit L1. In addition, an extraordinary dispersion glass material is preferably used for two or more lenses each having a positive refractive power.

The second lens unit L2 is constituted by a cemented lens which is composed by cementing two lenses G21 and G22 each having a negative refractive power, a lens G23 having a positive refractive power, and a lens G24 having a negative refractive power.

In addition, an aspheric surface is introduced into the second lens unit L2 to satisfactorily correct the off-axis optical performance such as distortion. The aspheric surface at this time desirably has a shape in which the positive refractive power thereof becomes weaker from a central position towards a peripheral portion of the lens.

The third lens unit L3 is constituted by a lens G31 having a negative refractive power which has a concave surface on the object side, and a lens G32 having a positive refractive power. The fourth lens unit L4 is constituted by a lens G41 having a positive refractive power and a cemented lens which is composed of a lens G42 having a negative refractive power and a lens G43 having a positive refractive power.

In each of the embodiments, the first to fourth lens units L1 to L4 are constituted in such a manner as described above, whereby the zoom lens having a large aperture, a high zooming ratio, and a small front lens diameter can be attained while a long back focus is ensured so as to allow the color separation prism to be inserted between the lens system and the image plane IP.

In each of the embodiments, one or more conditions of the following conditions are satisfied, thereby obtaining the effects corresponding to each condition.

Letting N21 be a refractive index of the material of the lens G21, BF be a smaller one of back focuses in air conversion quantities from the fourth lens unit L4 to the image plane IP in focused on an infinite object at the wide-angle end and at the telephoto end, fw be a focal length of the whole system at the wide-angle end, L3 be a distance on the optical axis between the stop SP and the object side concave surface of the lens G31, f3 be a focal length of the third lens unit L3, f4 be a focal length of the fourth lens unit L4, and R22 be a radius of curvature of the image side surface of the lens G21, the following conditional expressions (1) to (5) are satisfied:

$$1.90 < N21 < 2.50 \quad (1),$$

$$4.5 < BF/fw < 8.0 \quad (2),$$

$$1.2 < L3/fw < 2.0 \quad (3),$$

$$2.2 < f3/f4 < 2.75 \quad (4),$$

$$1.62 < R22/fw < 2.72 \quad (5).$$

Next, the technical meanings of the conditional expressions (1) to (5) will be described.

The conditional expression (1) relates to the refractive index N21 of the material of the lens G21 having a negative refractive power of the second lens unit L2, and is used to indirectly miniaturize the front lens diameter. The front lens diameter mainly depends on an emission angle and a height of an off-axis light beam from the second lens unit L2. Thus, if the refractive index of the material of the lens G21 is set so as to satisfy the conditional expression (1), the height of the off-axis light beam passing through the front lens is reduced, and hence the front lens diameter can be configured small. If the refractive index N21 falls below a lower limit, the front lens diameter becomes large. On the other hand, if the refractive index N21 exceeds an upper limit, the front lens diameter becomes small, however the Petzval's sum becomes ill-balanced to cause the curvature of field. This state is unfavorable.

The conditional expression (2) is a condition for ensuring of the back focus BF having a desired length. If the ratio of BF/fw exceeds an upper limit so that the back focus becomes too long, the total length of the zoom lens system increases to cause scaling up the whole zoom lens system. On the other hand, if the ratio of BF/fw falls below a lower limit so that the back focus becomes too short, it becomes difficult to install therein the optical member such as the color separation prism.

The conditional expression (3) is a condition for ensuring of insertion of an optical member such as the aperture stop SP or an ND filter in the optical path. If the ratio of L3/fw falls below a lower limit, it becomes difficult to insert the optical member in the optical path. On the other hand, if the ratio of L3/fw exceeds an upper limit, the whole optical system is caused to be scaled up, and at the same time, it becomes difficult to correct the spherical aberration in the zoom position at the wide-angle end.

The conditional expression (4) relates to a ratio of the focal length f3 of the third lens unit L3 to the focal length f4 of the fourth lens unit L4. Thus, under the conditional expression (4), the back focus BF and the exit pupil are made sufficiently long to retain the excellent optical performance while the whole optical system in and after the aperture stop SP is miniaturized. If the ratio of f3/f4 falls below the lower limit so that the focal length f3 of the third lens unit L3 becomes short, it becomes difficult to ensure the back focus having a sufficient length. If the focal length f4 of the fourth lens unit L4 becomes long, a movement quantity of the fourth lens unit L4 during focusing becomes large to increase a fluctuation in the spherical aberration, and hence it becomes difficult to correct the spherical aberration.

On the other hand, if the ratio of f3/f4 exceeds an upper limit so that the focal length of the third lens unit L3 becomes long, the divergence of the light fluxes emitted from the third lens unit L3 increases, and hence an effective diameter of the fourth lens unit L4 becomes large to make the whole lens system heavier. This is unfavorable.

The conditional expression (5) relates to a condition of the radius of curvature of the image side surface of the lens G21 of the second lens unit L2 disposed in the most object side. Under the conditional expression (5), the aberration correction is satisfactorily carried out by reducing the lens effective diameter of the first lens unit L1 (front lenses). If the ratio of R22/fw falls below a lower limit so that the radius of curvature of the surface becomes small, the incidence height of the off-axis light beam from the first lens unit L1 to the second lens unit L2 in the zoom intermediate position becomes high to cause the effective diameter of the first lens unit L1 to be increased. This is unfavorable. On the other hand, if the ratio of R22/fw exceeds an upper limit so that the radius of curvature of the surface becomes large, the astigmatism in the zoom position at the wide-angle end increases so that the meridional image plane is formed in the under direction. This is also unfavorable.

Note that the numerical value ranges of the conditional expressions (1) to (5) are more preferably set as follows:

$$1.95 < N21 < 2.2 \quad (1a),$$

$$4.6 < BF/fw < 5.5 \quad (2a),$$

$$1.4 < L3/fw < 1.8 \quad (3a),$$

$$2.25 < f3/f4 < 2.73 \quad (4a),$$

$$1.625 < R22/fw < 2.3 \quad (5a).$$

Note that in each of the embodiments, optical members each having a small refractive power may be disposed on the image side of the fourth lens unit L4 or on the object side of the first lens unit L1.

Next, an embodiment of the video camera (image pickup apparatus) using the zoom lens system of the present invention as a photographing optical system will be described with reference to FIG. 13.

In FIG. 13, reference numeral 10 designates a video camera body, reference numeral 11 designates a photographing optical system constituted by the zoom lens system of the present invention, reference numeral 12 designates a solid-state image pickup element such as a CCD for receiving light beams of a subject image by the photographing optical system 11, reference numeral 13 designates a memory for recording therein data of the subject image the light beams of which are received by the image pickup element 12, and reference numeral 14 designates a finder through which a user is to observe the subject image displayed on a display element.

The above-mentioned display element is constituted by a liquid crystal panel and the like, and the subject image formed on a surface of the image pickup element 12 is displayed on the display element. Reference numeral 15 designates a liquid crystal display panel having the same function as that of the finder 14.

The zoom lens system of the present invention can be applied to the image pickup apparatus such as a video camera in such a manner, thereby realizing an optical apparatus having high optical performance.

As described above, according to each of the embodiments, it is possible to obtain the zoom lens system which has the high optical performance in spite of the high zooming ratio by miniaturizing the whole lens system, and the image pickup apparatus using the same.

In addition, according to each of the embodiments, the zoom lens system having the excellent performance over the whole zoom range and the whole object distance can be provided. The zoom lens system has the high optical performance over the whole zoom range from the zoom position in the wide-angle end to the zoom position in the telephoto end in spite of the large zooming ratio not less than 20 times and over the whole object distance from the infinite object to the much nearer object. Further, the zoom lens system has the long back focus so as to enable an optical element such as a color separation prism to be inserted in spite of the large aperture ratio having an F-number of about 1.6, to whereby ensure a space into which a more complicated stop mechanism can be inserted, a space into which an ND filter can be inserted, and the like.

Hereinafter, Numerical Embodiments 1, 2, and 3 corresponding to Embodiments 1, 2, and 3, respectively, will be shown. In each of Numerical Embodiments 1, 2, and 3, reference symbol i designates the order of a corresponding surface from the object side, reference symbol ri designates a radius of curvature of a corresponding surface, reference symbol di designates an interval between an i-th surface and an (i+1)-th surface, and reference symbols ni and vi designate a refractive index and an Abbe's number with a d-line as a reference, respectively. In addition, in each of Numerical Embodiments 1 and 2, five planes in the image plane side are planes corresponding to a crystal low-pass filter, an infrared cut filter, and the like.

Letting X be a displacement in an optical axis direction at height H from the optical axis with a surface vertex as a reference, an aspheric surface is expressed as follows:

$$x = \frac{(1/R)h^2}{1+\sqrt{\{1-(1+k)(h/R)^2\}}} + Ah^2 + Bh^4 + Ch^6 + Dh^8 + Eh^{10},$$

where R represents a paraxial radius of curvature, k represents a conic constant, and A, B, C, D, and E are aspheric surface coefficients, respectively.

In addition, "e-X" represents "×10$^{-X}$", f represents a focal length, Fno represents an F-number, and ω represents a half-field angle. Also, a relationship between the conditional expressions described above and numeric values in Numerical Embodiments 1, 2, and 3 are shown in Table 1.

| Numerical Embodiment 1 | | | |
|---|---|---|---|
| F = 1-19.95 | Fno = 1.65-3.50 | 2ω = 55.9-3.1 | |
| R1 = 14.300 | D1 = 0.40 | N1 = 1.846660 | v1 = 23.9 |
| R2 = 9.053 | D2 = 0.23 | | |
| R3 = 12.403 | D3 = 0.96 | N2 = 1.433870 | v2 = 95.1 |
| R4 = −37.756 | D4 = 0.03 | | |
| R5 = 7.026 | D5 = 0.87 | N3 = 1.603112 | v3 = 60.6 |
| R6 = 37.415 | D6 = Variable | | |
| R7 = 8.945 | D7 = 0.16 | N4 = 2.003300 | v4 = 28.3 |
| R8 = 1.642 | D8 = 0.70 | | |
| R9 = −4.195 | D9 = 0.14 | N5 = 1.772499 | v5 = 49.6 |
| R10 = 25.009 | D10 = 0.03 | | |
| R11 = 3.645 | D11 = 0.76 | N6 = 1.846660 | v6 = 23.9 |
| R12 = −2.850 | D12 = 0.13 | N7 = 1.834807 | v7 = 42.7 |
| R13 = 23.873 | D13 = Variable | | |
| R14 = Diaphragm | D14 = 1.62 | | |
| R15 = −5.330 | D15 = 0.18 | N8 = 1.696797 | v8 = 55.5 |
| R16 = −22.955 | D16 = 0.29 | | |
| *R17 = 11.595 | D17 = 0.72 | N9 = 1.583126 | v9 = 59.4 |
| R18 = −5.303 | D18 = Variable | | |
| *R19 = 6.040 | D19 = 0.70 | N10 = 1.583126 | v10 = 59.4 |
| R20 = −24.166 | D20 = 0.28 | | |
| R21 = 10.694 | D21 = 0.18 | N11 = 1.846660 | v11 = 23.9 |
| R22 = 3.905 | D22 = 0.85 | N12 = 1.487490 | v12 = 70.2 |
| R23 = −7.528 | D23 = Variable | | |
| R24 = ∞ | D24 = 0.29 | N13 = 1.516330 | v13 = 64.1 |
| R25 = ∞ | D25 = 0.92 | | |

-continued

| Numerical Embodiment 1 | | |
|---|---|---|
| F = 1-19.95 | Fno = 1.65-3.50 | 2ω = 55.9-3.1 |
| R26 = ∞ | D26 = 0.25 | N14 = 1.550000  ν14 = 60.0 |
| R27 = ∞ | D27 = 0.29 | N15 = 1.520000  ν15 = 69.0 |
| R28 = ∞ | D28 = 3.61 | N16 = 1.589130  ν16 = 61.2 |
| R29 = ∞ | D29 = 0.14 | N17 = 1.516330  ν17 = 64.2 |
| R30 = ∞ | | |

*represents an aspherical surface

TABLE 1

| | Focal Distance | | |
|---|---|---|---|
| Variable Interval | 1.00 | 8.44 | 19.95 |
| D6 | 0.17 | 7.36 | 8.73 |
| D13 | 8.88 | 1.69 | 0.32 |
| D18 | 4.16 | 2.81 | 4.04 |
| D23 | 0.90 | 2.25 | 1.02 |

Aspherical Coefficients

R17

K = 1.67238e+01   B = −3.57245e−03   C = −1.13127e−04   D = 3.10466e−05
E = −1.35059e−05   F = 1.40468e−06

R19

K = −1.67397e+00   B = −5.27438e−04   C = −3.10717e−05   D = −2.23919e−06
E = 3.84914e−07   F = −1.56084e−07

Numerical Embodiment 2

| F = 1-20.11 | Fno = 1.65-3.50 | 2ω = 56.0-3.0 |
|---|---|---|
| R1 = 14.376 | D1 = 0.39 | N1 = 1.846660   ν1 = 23.9 |
| R2 = 8.937 | D2 = 0.26 | |
| R3 = 13.255 | D3 = 0.92 | N2 = 1.433870   ν2 = 95.1 |
| R4 = −30.689 | D4 = 0.04 | |
| R5 = 6.736 | D5 = 0.99 | N3 = 1.603112   ν3 = 60.6 |
| R6 = 35.677 | D6 = Variable | |
| R7 = 10.687 | D7 = 0.16 | N4 = 2.003300   ν4 = 28.3 |
| R8 = 1.632 | D8 = 0.63 | |
| R9 = −4.082 | D9 = 0.14 | N5 = 1.772499   ν5 = 49.6 |
| R10 = 31.587 | D10 = 0.07 | |
| R11 = 3.679 | D11 = 0.68 | N6 = 1.846660   ν6 = 23.9 |
| R12 = −3.105 | D12 = 0.12 | N7 = 1.804000   ν7 = 46.6 |
| R13 = 19.623 | D13 = Variable | |
| R14 = Stop | D14 = 1.59 | |
| R15 = −5.329 | D15 = 0.18 | N8 = 1.696797   ν8 = 55.5 |
| R16 = −21.770 | D16 = 0.29 | |
| *R17 = 11.762 | D17 = 0.71 | N9 = 1.583126   ν9 = 59.4 |
| R18 = −5.198 | D18 = Variable | |
| *R19 = 5.750 | D19 = 0.57 | N10 = 1.583126   ν10 = 59.4 |
| R20 = −25.489 | D20 = 0.27 | |
| R21 = 11.211 | D21 = 0.18 | N11 = 1.846660   ν11 = 23.9 |
| R22 = 3.927 | D22 = 0.87 | N12 = 1.487490   ν12 = 70.2 |
| R23 = −7.440 | D23 = Variable | |
| R24 = ∞ | D24 = 0.28 | N13 = 1.516330   ν13 = 64.1 |
| R25 = ∞ | D25 = 0.90 | |
| R26 = ∞ | D26 = 0.24 | N14 = 1.550000   ν14 = 60.0 |
| R27 = ∞ | D27 = 0.28 | N15 = 1.520000   ν15 = 69.0 |

-continued

| Numerical Embodiment 2 | | |
|---|---|---|
| F = 1-20.11 | Fno = 1.65-3.50 | 2ω = 56.0-3.0 |
| R28 = ∞ | D28 = 3.54 | N16 = 1.589130   ν16 = 61.2 |
| R29 = ∞ | D29 = 0.14 | N17 = 1.516330   ν17 = 64.2 |
| R30 = ∞ | | |

*represents an aspherical surface

TABLE 2

| | Focal Length | | |
|---|---|---|---|
| Variable Interval | 1.00 | 8.31 | 20.11 |
| D6 | 0.17 | 7.15 | 8.48 |
| D13 | 8.63 | 1.65 | 0.32 |
| D18 | 4.52 | 3.23 | 4.51 |
| D23 | 0.91 | 2.20 | 0.91 |

Aspherical Coefficients

R17

K = 1.94379e+01  B = −3.81411e−03  C = −9.99124e−05  D = 2.43876e−05
E = −1.61899e−05  F = 1.80718e−06

R19

K = −1.62724e+00  B = −5.03929e−04  C = 2.06087e−05  D = −2.10942e−06
E = 1.96652e−07  F = −1.14479e−07

Numerical Embodiment 3

F = 1-19.97    Fno = 1.65-3.01    2ω = 55.9-3.0

| | | | |
|---|---|---|---|
| R1 = 18.505 | D1 = 0.37 | N1 = 1.846660 | ν1 = 23.9 |
| R2 = 10.020 | D2 = 0.20 | | |
| R3 = 13.916 | D3 = 0.88 | N2 = 1.433870 | ν2 = 95.1 |
| R4 = −38.429 | D4 = 0.04 | | |

TABLE 3

| | Focal Length | | |
|---|---|---|---|
| Variable Interval | 1.00 | 8.56 | 19.97 |
| D6 | 0.17 | 8.01 | 9.51 |
| D13 | 9.64 | 1.80 | 0.30 |
| D19 | 4.25 | 2.99 | 4.22 |
| D24 | 0.88 | 2.14 | 0.91 |

Aspherical Coefficients

R18

K = 2.06512e+01  B = −3.89664e−03  C = −3.98798e−04  D = 4.84792e−05
E = −1.67770e−05  F = −3.41050e−07

R19

K = −2.93756e−01  B = −1.82592e−03  C = 1.04935e−04  D = −6.26116e−06
E = −4.35184e−06  F = 7.04244e−07

-continued

Numerical Embodiment 3

F = 1-19.97    Fno = 1.65-3.01    2ω = 55.9-3.0

| | | | |
|---|---|---|---|
| R5 = 7.860 | D5 = 0.78 | N3 = 1.712995 | ν3 = 53.9 |
| R6 = 39.719 | D6 = Variable | | |
| R7 = 8.361 | D7 = 0.16 | N4 = 2.003300 | ν4 = 28.3 |
| R8 = 1.708 | D8 = 0.71 | | |
| R9 = −3.860 | D9 = 0.14 | N5 = 1.882997 | ν5 = 40.8 |
| R10 = −119.684 | D10 = 0.02 | | |
| R11 = 4.273 | D11 = 0.54 | N6 = 1.922860 | ν6 = 18.9 |
| R12 = −7.098 | D12 = 0.12 | N7 = 1.806098 | ν7 = 40.9 |
| R13 = 42.972 | D13 = Variable | | |
| R14 = Stop | D14 = 1.67 | | |
| R15 = −5.882 | D15 = 0.18 | N8 = 1.696797 | ν8 = 55.5 |
| R16 = −50.915 | D16 = 0.18 | N9 = 1.834807 | ν9 = 42.7 |
| R17 = −33.354 | D17 = 0.03 | | |
| *R18 = 10.621 | D18 = 0.67 | N10 = 1.583126 | ν10 = 59.4 |
| R19 = −5.923 | D19 = Variable | | |
| *R20 = 5.827 | D20 = 0.58 | N11 = 1.583126 | ν11 = 59.4 |
| R21 = −20.718 | D21 = 0.29 | | |
| R22 = 11.337 | D22 = 0.18 | N12 = 1.846660 | ν12 = 23.9 |
| R23 = 4.054 | D23 = 0.87 | N13 = 1.487490 | ν13 = 70.2 |
| R24 = −7.318 | D24 = Variable | | |
| R25 = ∞ | D25 = 0.28 | N14 = 1.516330 | ν14 = 64.1 |
| R26 = ∞ | D26 = 0.90 | | |
| R27 = ∞ | D27 = 0.24 | N15 = 1.550000 | ν15 = 60.0 |
| R28 = ∞ | D28 = 0.28 | N16 = 1.520000 | ν16 = 69.0 |
| R29 = ∞ | D29 = 3.54 | N17 = 1.589130 | ν17 = 61.2 |
| R30 = ∞ | D30 = 0.14 | N18 = 1.516330 | ν17 = 64.2 |
| R31 = ∞ | | | |

*represents an aspherical surface

TABLE 4

| Conditional | Numerical Embodiment | | |
|---|---|---|---|
| Expression | 1 | 2 | 3 |
| (1) | 2.00 | 2.00 | 2.00 |
| (2) | 4.89 | 4.83 | 4.79 |
| (3) | 1.62 | 1.59 | 1.67 |
| (4) | 2.36 | 2.28 | 2.70 |
| (5) | 1.64 | 1.63 | 1.71 |

This application claims foreign priority from Japanese Patent Application No. 2004-024343 filed Jan. 30, 2004, which is hereby incorporated by reference herein.

What is claimed is:

1. A zoom lens system, in an order from an object side to an image side, comprising:

a first lens unit having a positive optical power;

a second lens unit having a negative optical power;

a third lens unit having a positive optical power; and a fourth lens unit having a positive optical power, wherein intervals of the lens units are changed during zooming; and wherein letting $N21$ be a refractive index of a material constituting a negative lens element disposed on the most object side in the second lens unit, a following condition is satisfied:

$1.95 < N21 < 2.50$.

2. A zoom lens system according to claim 1, wherein the zoom lens system forms an image on a solid-state image pickup element.

3. An image pickup apparatus, comprising:
a zoom lens system according to claim 1; and
a solid-state image pickup element for receiving light of an image formed by the zoom lens system.

* * * * *